Jan. 30, 1962  K. B. HARLOW  3,019,276
COMBUSTION SYSTEMS FOR INTERNAL COMBUSTION ENGINES
Filed June 6, 1960
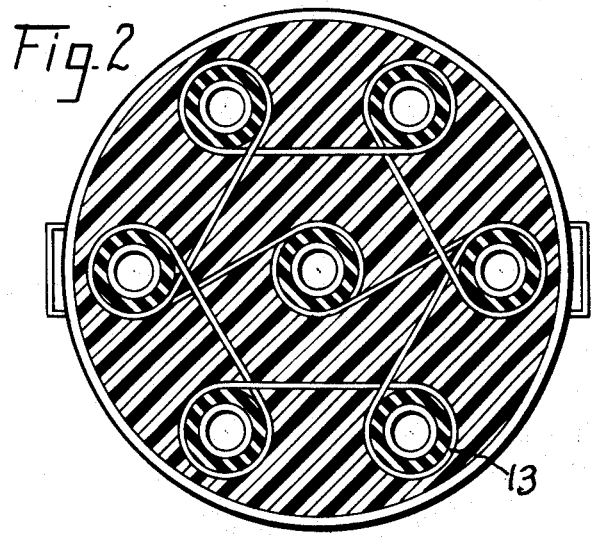
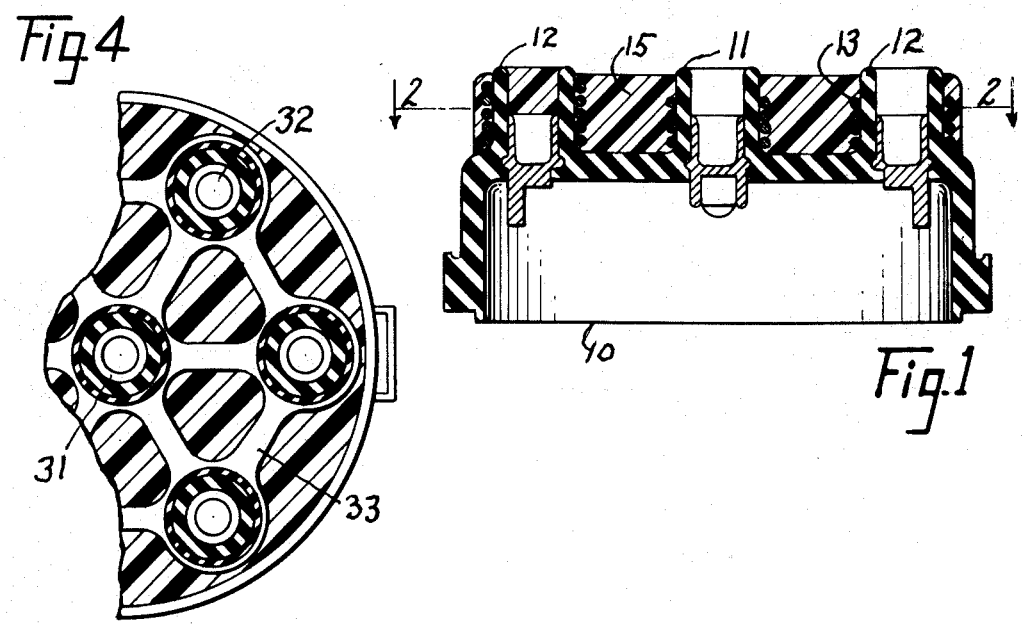
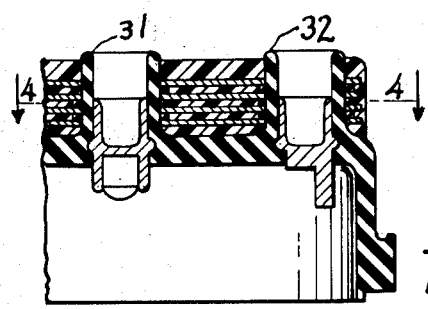
INVENTOR
Kenneth B. Harlow
BY Edwin S. Hall
ATTORNEY

United States Patent Office 3,019,276
Patented Jan. 30, 1962

3,019,276
COMBUSTION SYSTEMS FOR INTERNAL COMBUSTION ENGINES
Kenneth B. Harlow, 18192 Chipstead Drive, South Bend, Ind.
Filed June 6, 1960, Ser. No. 34,059
3 Claims. (Cl. 123—148)

This invention relates to combustion systems for internal combustion engines. The broad object of the invention is to provide improved means and process for preconditioning the charge in an internal combustion engine to insure more efficient combustion, to reduce the amount of CO and other harmful exhaust products, and to improve engine performance: smoother idling, faster acceleration, higher top speed, better fuel economy, etc.

More specifically, an object of the invention is to provide an improved ignition system which, in the interval between successive ignitions in a cylinder, will pass a non-igniting electrical disturbance to the charge in the cylinder, repeatedly or continuously, to ionize or otherwise precondition the charge in advance of the firing spark to insure more efficient combustion.

Another object is to provide, in connection with a multi-cylinder spark-ignition engine, a distributor cover constructed and arranged to deliver the igniting spark to one cylinder and at the same time to bombard the contents of the other cylinders with non-igniting electrical discharges to ionize or otherwise precondition the charges and thus to produce more efficient combustion and improved engine performance. Another object is to provide means for adjusting or predetermining the relative intensity of the non-igniting discharges to suit any engine. Another object is to accomplish the foregoing with no substantial increase in manufacturing cost.

Briefly described, the invention consists of means for collecting the static and corona type electrical emissions in the region surrounding a conductor carrying a high-voltage discharge such as that used to ignite a charge in a cylinder, and for distributing these non-igniting emissions to the contents of a combustion chamber, to ionize or otherwise precondition the charge and prepare it for ignition.

These emissions when properly filtered through suitable insulating or semi-conductive materials, are not visible to the eye, but are capable of agitating both metallic and nonmetallic dust. They contain, apparently, no infrared rays; they are cold, and have no power to ignite the charge. They are apparently below the visible range of the spectrum, in the ultraviolet range, shorter in wave length and higher in frequency than visible light rays but longer in wave length and lower in frequency than X-rays.

These emissions follow metallic conduits readily. They launch themselves into air or space or other insulating material when they reach the end of a conductor, more readily when the end is pointed. Wires or conductors of .025" diameter or smaller will readily project the emissions; larger wires will not, so readily; however, if they have nicks or scratches, the sharp edges will project the emissions.

The invention and its objects will be readily understood from the following specification in connection with the drawings in which:

FIG. 1 is an axial sectional view of the invention in a distributor cover;

FIG. 2 is a transverse section taken on the line 2—2 of FIG. 1;

FIG. 3 is an axial sectional view of a modification of the invention; and

FIG. 4 is a transverse section taken on the line 4—4 of FIG. 3.

Referring to the drawings, the distributor cover 10 of FIG. 1 and FIG. 2 is of the usual construction with a central tower socket 11 for receiving the insulated lead from the coil, and terminal tower sockets 12 for receiving the leads to the several spark plugs of the engine. A fine wire 13 is wound several turns around and outside of the insulating material of each of the terminal towers in series, and optionally around the central tower 11. The several coils are all electrically connected, being formed of the same piece of wire. The diameter of the wire and the number of coils around each of the towers together with the thickness and type of insulation between the coils and the conductor carrying the firing spark, predetermine the intensity of the emissions which will be inducted to, picked up and delivered to the several combustion chambers. After the wire is in place, the wire and the towers are embedded in epoxy resin 15 or other insulating material.

In operation, whenever an igniting high-voltage current is delivered from the coil to the socket in central tower 11 and transmitted by the rotor (not shown) to a terminal tower socket 12 and the corresponding spark plug of the engine, certain emissions surrounding this current are picked up by the coils of wire 13 surrounding tower 11 and the particular tower 12, and transmitted by wire 13 to the other coils and by their respective leads and spark plugs to all combustion chambers of the engine, to ionize or otherwise precondition the charge in one or more of the cylinders.

In producing the modification of the invention shown in FIGS. 3 and 4, a plurality of metallic plates 33 are inserted in the mold in spaced relation with the usual metallic sockets 31 and 32. Then the mold is filled with Bakelite or other insulating material in the usual manner. The number, size, shape and insulating spacing of the metallic plates may be chosen for any given engine to predetermine the maximum amount of non-igniting activity to be transmitted to the several combustion chambers.

In operation, whenever an igniting high-tension current is delivered from the coil to the socket 31 and by the distributor rotor (not shown) to a socket 32 and the corresponding spark plug and combustion chamber of the engine, the electrical disturbance or emissions surrounding this momentary current are inducted to and picked up by plates 33 and transmitted by induction to all other leads and spark plugs, to precondition the charges in the combustion chambers of the engine.

While the invention has been shown with coils or plates surrounding the terminal sockets in the distributor cover, it is obvious that the same results could be attained with pickup antennas adjacent to but insulated from any wire carrying a high-voltage current. Moreover it is clear that the invention could be applied to a single-cylinder engine or to a compression-ignition engine by providing independent means for producing and delivering the non-igniting emissions.

Having thus described the invention and its operation, it is obvious that the objects, as stated, have been attained in a practical manner. While the invention has been shown built into the distributor cover, it is obvious that it could be built as a separate unit surrounding the several spark plug leads. It is understood that these and other changes may be made in the construction and in the arrangement and operation of the invention without departing from the spirit or scope of the invention as expressed in the following claims.

I claim:

1. A device for improving the combustion in the combustion chamber of an internal combustion engine having an ignition system including high-voltage wiring and spark plugs, said device comprising a distributor cover having the usual terminal sockets for receiving said high-voltage wiring, metallic coils about but insulated from said sockets, and a metallic interconnection between said coils.

2. A device for improving the combustion in the combustion chamber of an internal combustion engine having an ignition system including high-voltage wires and spark plugs, said device comprising interconnected metallic conductors surrounding said high-voltage wires and insulated therefrom and from any other part of said engine.

3. In a device for improving the combustion in the combustion chamber of an internal combustion engine, means for preconditioning the charge in the chamber, said means including a wire transmitting a high-voltage current, a metallic conductor surrounding but insulated from said wire and from any other part of said engine, and constructed to pick up and transmit non-igniting electrical disturbances to the contents of a combustion chamber in the intervals between ignitions.

References Cited in the file of this patent
UNITED STATES PATENTS

| | | |
|---|---|---|
| 1,994,128 | Foust | Mar. 12, 1935 |
| 2,161,043 | Heintz | June 6, 1939 |
| 2,351,682 | Hendry et al. | June 20, 1944 |
| 2,799,792 | Flint | July 16, 1957 |